Jan. 3, 1939.  R. L. ROUGEMONT  2,142,736
MACHINE FOR METALWORKING
Filed June 18, 1937  5 Sheets—Sheet 1

INVENTOR
Rene Louis Rougemont
By Parker, Carlson, Pitner & Hubbard
ATTORNEYS

Jan. 3, 1939. R. L. ROUGEMONT 2,142,736
MACHINE FOR METALWORKING
Filed June 18, 1937 5 Sheets-Sheet 3

Fig.3

INVENTOR
Rene Louis
Rougemont
By Parker, Carlson, Pitzner & Hubbard
ATTORNEYS

Patented Jan. 3, 1939

2,142,736

UNITED STATES PATENT OFFICE 2,142,736

MACHINE FOR METALWORKING

René Louis Rougemont, Rockford, Ill., assignor to The Ingersoll Milling Machine Company, Rockford, Ill., a corporation of Illinois Application June 18, 1937, Serial No. 148,825

31 Claims. (Cl. 90—18)

The invention relates to a machine for metal working and more particularly for performing metal removing operations such, for example, as scalping the side surfaces of metal slabs or other work pieces.

One object of the present invention is to provide a novel machine for scalping or removing metal from the surfaces of successive work pieces of different sizes and dimensions in a minimum time and without the necessity of making manual adjustments in the settings of various elements of the machine to accommodate the process for differences in dimensions and sizes of individual work pieces.

A further object is to provide a machine in which a work piece is clamped on a work holder and which is then adapted automatically to vary the settings of the several cooperating parts thereof relative to the clamped work piece to accommodate work pieces of different sizes and dimensions preparatory to scalping the surfaces thereof.

Still another object is to provide a scalping machine of the character described which is adapted to complete entirely automatically a cycle of operation in which the scalping tool is positioned relative to the work piece, the scalping operation performed, and the machine returned to its initial position.

The invention also resides in certain structural improvements in the feeler mechanism disclosed herein for initially positioning the scalping cutter and work piece preparatory to removing a layer of metal of selected thickness, as well as in various machine tool control arrangements embodied in the exemplary machine disclosed herein.

Further objects and advantages of the invention will become apparent as the following description proceeds and the features of novelty which characterize the invention are pointed out with particularity in the claims annexed to and forming a part of this specification.

For a better understanding of the invention, reference may be had to the accompanying drawings, in which—

While the invention is applicable to various industries and a variety of different kinds of work pieces, it will be described herein for convenience of illustration in connection with the preparation of cast slabs or ingots 10 of metal for rolling, drawing, or like operations. There is no intention, however, to thereby limit the invention by such disclosure, but on the other hand, the appended claims are intended to cover all modifications and alternative constructions falling within the spirit and scope of the invention.

It is desirable initially to remove the oxidized surface layers of metal from the opposite sides of aluminum ingots in preparing them for rolling into sheet form. This metal removing operation is performed prior to presenting the ingots to the sheeting rolls to avoid thereby possible imperfections in the rolled sheets. Furthermore, at various stages in the rolling process, it has been found to be desirable to remove the surface layers from the slabs of metal. It will thus be seen that the scalping operation must be performed on slabs of different thicknesses depending upon how much the thickness has been reduced by preceding rolling operations and also depending upon the size of the molds in which the ingots are originally cast.

The present invention contemplates scalping or machining, for example, the sides of a metal slab by first clamping the slab in position on a work support, positioning the active face of a cutting tool laterally offset from the slab and in a plane substantially paralleling the slab face to be scalped but at a predetermined distance below a point or small area selected at random on the slab face, and then effecting a relative feed movement between the clamped slab and cutter longitudinally in such plane across the face of the slab. Since the reference point for positioning the cutter is located on the face of the work piece to be machined, no account need be taken of the thickness of metal lying behind this surface of the work piece and consequently, it will be seen that no alterations in the process are required due to varying thicknesses of the work pieces encountered. In the case of aluminum slabs, the scalping operation is first performed on one side of the slab and its position with respect to the cutter is then reversed and the process repeated so that smooth machined faces are formed on both sides of the slab. In the case of very large and heavy work pieces, it is important that they be initially clamped on the work support and the machine tool elements then adjusted to effect the desired scalping since the size and weight of such work pieces makes their manipulation on the work support difficult and slow.

Figure 1:
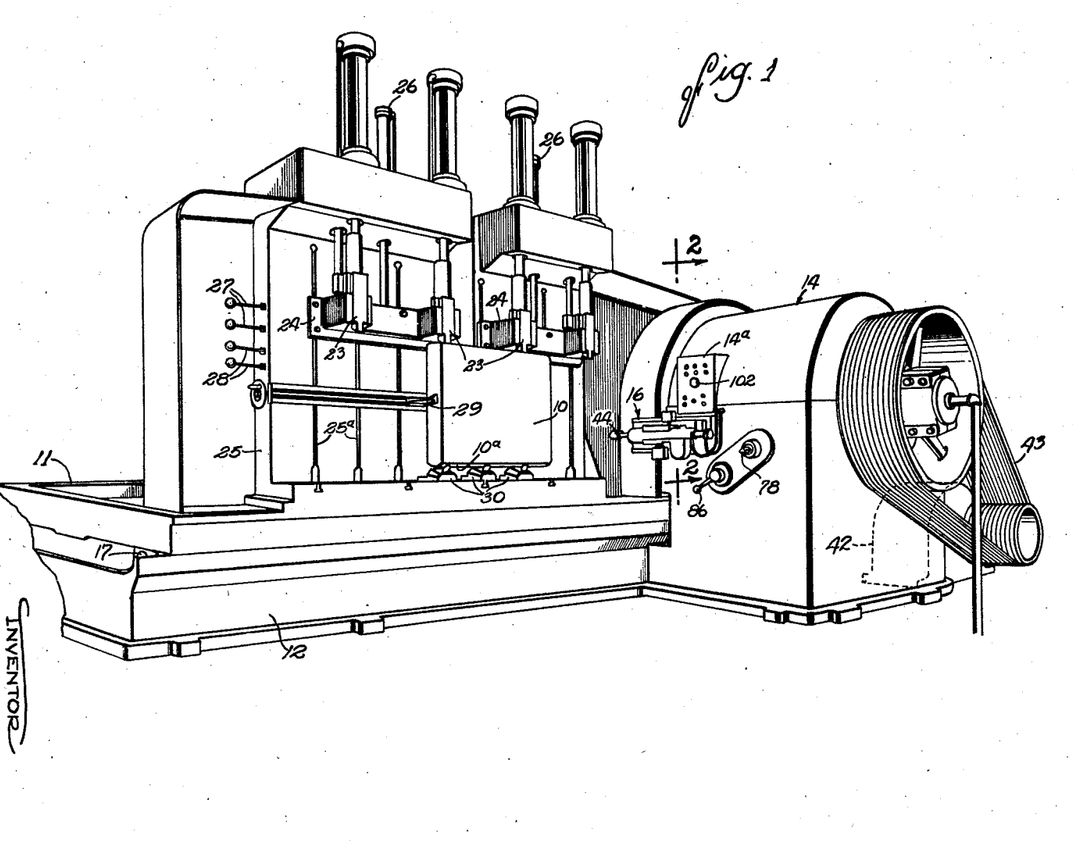
Figure 1 is a perspective view of one preferred form of machine tool for scalping the surfaces of metal slabs in accordance with the teachings of the present invention.

The machine selected for purposes of illustration includes as its principal elements a work support illustrated in the form of a carriage 11 reciprocably mounted on a bed 12, a tool head 14 having a rotatable cutting tool 15 (Fig. 2) mounted thereon, and a feeler mechanism designated generally by the numeral 16 for automatically positioning the cutter 15 with respect to the work piece 10 located on the carriage 11. In the operation of the machine, the slab 10 is first clamped on the carriage 11 after which the carriage is moved along the bed 12 until the slab is positioned opposite the feeler 16 but laterally offset from the cutter 15. The outer end of the feeler 16 is adjustably positioned a predetermined distance A (Fig. 2) behind the plane of the face of the cutter 15 and the cutter and feeler are arranged to be advanced synchronously toward the carriage. Consequently, when the feeler is advanced into contact with the surface of the slab 10, the face of the synchronously advancing cutter is located in a plane paralleling the face of the slab and at the predetermined distance beyond the same corresponding to the thickness of the layer of metal to be removed. After this positioning of the cutter, it is locked against further axial movement and the feeler is retracted. The carriage 11 is then moved past the tool head at a suitable feed rate so that the rotating cutter 15 mills a smooth surface on the side of the slab 10 as it passes progressively across the same. On the completion of this milling operation, the cutter is retracted and the carriage returned to its initial position whereupon the slab may be reversed to expose its opposite side face and the same cutter positioning and scalping operations repeated. As herein illustrated, the machine embodies a control mechanism for causing the machine to operate automatically through the cycle described.

The work supporting carriage 11 is supported in suitable ways 17 for longitudinal sliding movement on the bed 12 and is reciprocated thereon by rotation of a worm 18 meshing with a rack 19 (Fig. 8) extending lengthwise of and fixed to the underside of the carriage. The driving mechanism for the carriage is of a well known form and consequently has been merely illustrated diagrammatically in Fig. 8. It includes in general a feed motor 20 and a reversible rapid traverse motor 21 operatively connected to the worm 18 through a differential gear mechanism 22 and adapted to rotate the same at different speeds to advance the carriage at a feed rate and to move the same in either direction at a rapid traverse rate.

A work piece such as the slab 10 is clamped firmly in position on the carriage 11 by means of hydraulically operated clamping members 23 (Fig. 1) vertically reciprocable in clamping heads 24. The heads 24 are in turn arranged for vertical adjustment on the face of an upstanding wall 25 supported by the carriage, the vertical adjustment of the heads being effected by hydraulic actuators 26. The heads 24 are held in position on the face of the wall 25 by T-bolts (not shown) riding in slots 25ª. The actuating mechanisms for the two sets of clamping members 23 are controlled by manual operating levers 27, and similarly the actuating mechanisms for the head 24 are controlled by manual operating levers 28. In positioning a slab on the carriage, the clamping heads 24 are first moved into their approximate desired position and a manually adjustable end-stop 29 is positioned. The slab is then hoisted into position by a crane or other suitable mechanism with its lower convex edge 10ª resting on supporting members 30 after which it is tilted into vertical position with its rear face resting firmly against abutments (not shown) on the wall 25, and finally the clamping members 23 are forced downwardly into firm engagement with the upper edge of the slab.

The cutting tool 15 (Fig. 2) has been illustrated in the form of a surfacing or face milling cutter having its active face or edges disposed in a substantially vertical plane paralleling the path of movement of the carriage 11. This cutter is rotatably mounted in the tool head 14 by a shaft 31 journaled in suitable roller bearings 32 within a quill or sleeve 33. The shoulder 34 and the collar 35 engage the inner bearing races 36 on the outer sides thereof. The outer bearing races 37 are positioned in an annular recess formed in the end of the sleeve 33 and held in position therein by an end plate 38 and a separating collar 39. The shaft 31 is thus free to rotate within the quill sleeve 33 but is held against axial movement with respect thereto. An axial spline connection between the tool head housing 14 and the quill sleeve 33 is formed by a pin 40 having its lower end fitted in an axial slot 41 formed in the outer side of the quill. This latter spline connection permits axial movement of the sleeve with respect to the housing but prevents rotational movement. The cutter shaft 31 is operatively connected to a suitable driving motor 42 (Fig. 1) through a plurality of V-type belts 43 and a spline coupling (not shown) which thus constitute a flexible connection permitting relative axial movement of the cutter shaft and the pulley. Upon reference to Fig. 2, it will be seen that the active face or cutting edge of the surfacing cutter 15 is positioned in a plane substantially paralleling that of the face of the slab 10 and thus serves to remove a layer of metal from this face as the slab is moved progressively across the cutter during the feed movement of the carriage 11.

Figure 2:
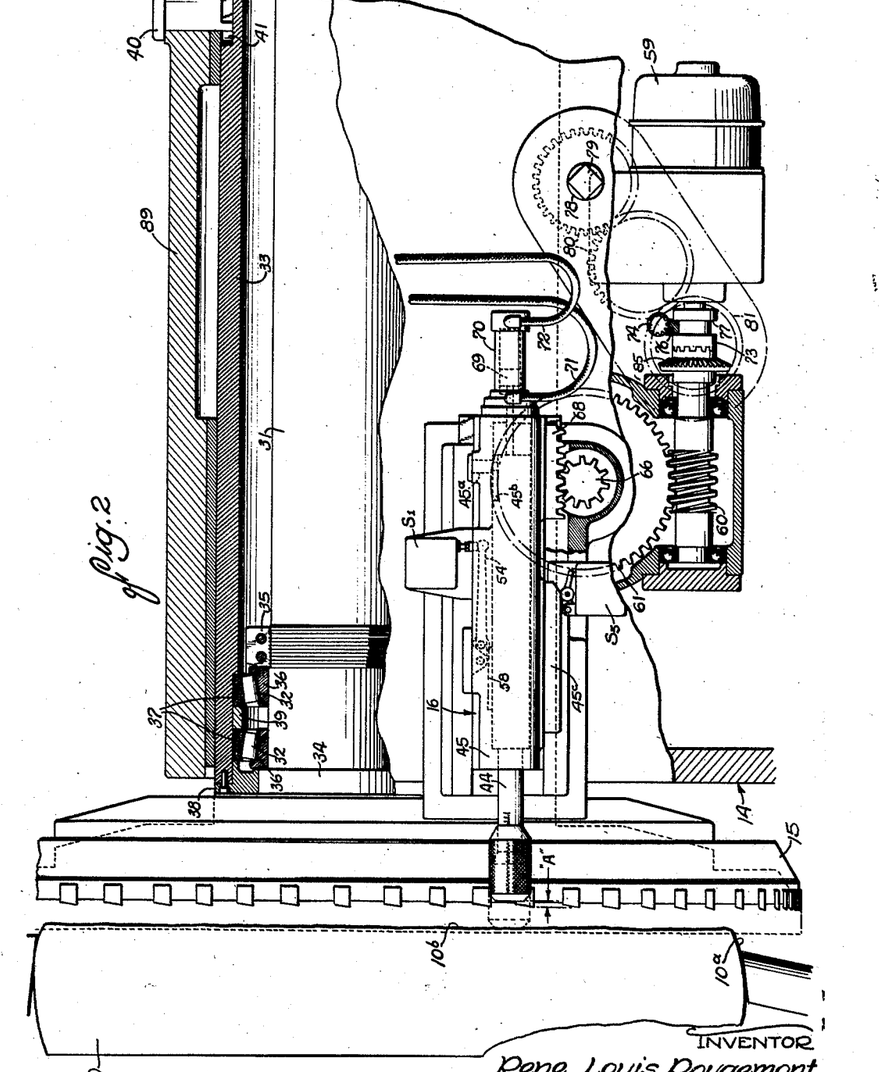
Fig. 2 is an enlarged detail view partly in section along the line 2—2 in Fig. 1 of a portion of the tool head included in the machine shown therein.
Figure 3:
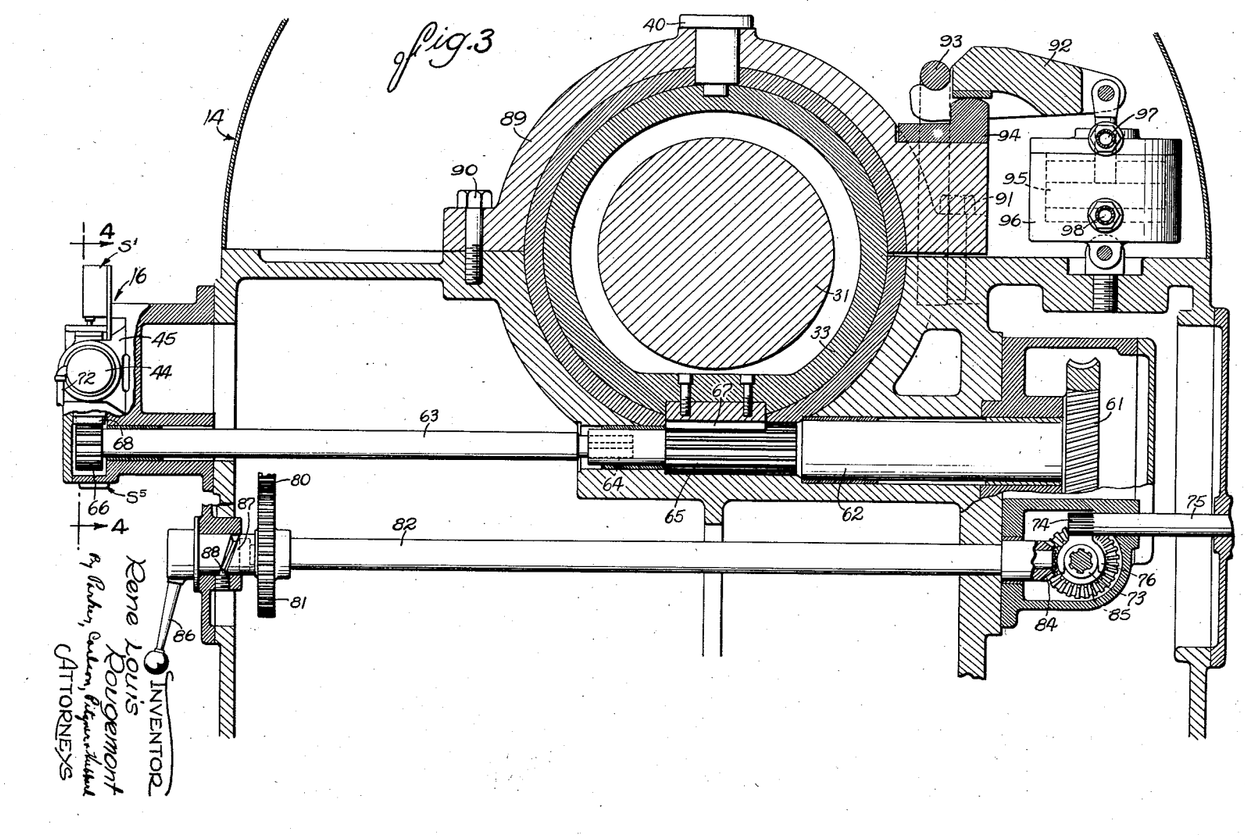
Fig. 3 is an enlarged end elevation partly in section of the tool head shown in Figs. 1 and 2.
Figure 4:
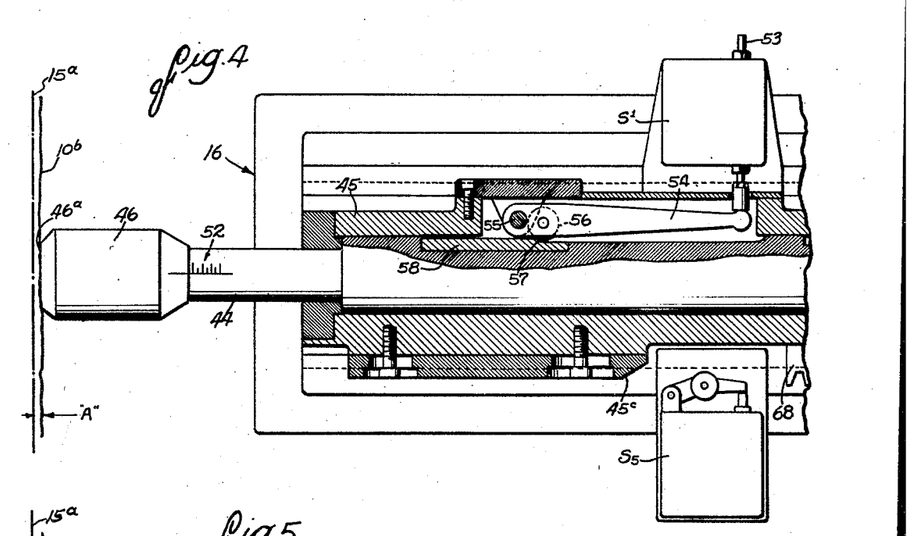
Figs. 4 and 5 are enlarged detail views of the feeler mechanism included in the machine shown in Fig. 1, the mechanism being illustrated as partly sectioned along the line 4—4 in Fig. 3.
Figure 5:
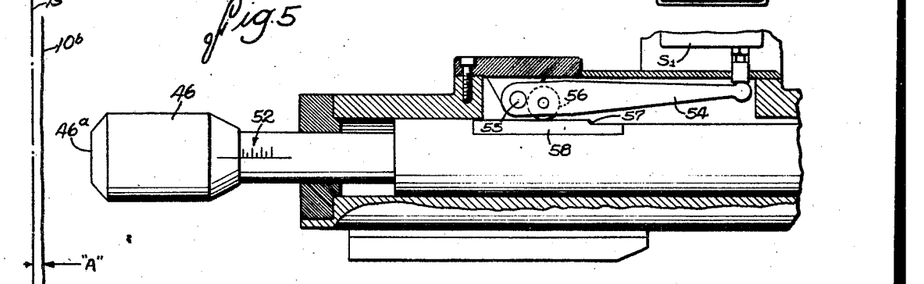
Figure 6:
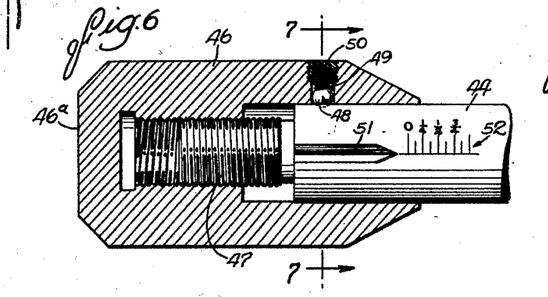
Figs. 6 and 7 are respectively enlarged longitudinal and transverse sectional views of the micrometer head included in the feeler mechanism shown in Figs. 4 and 5, Fig. 7 being a section along the line 7—7 in Fig. 6.
Figure 7:
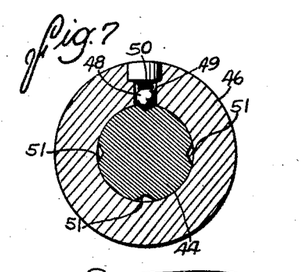

The feeler mechanism 16 serves to determine the thickness of the layer of metal scalped from the face of the slab and is arranged to position the cutter properly to remove a desired thickness of metal irrespective of the over-all thickness of the slab. The particular feeler mechanism illustrated includes an elongated cylindrical bar 44 (Figs. 2, 4 and 5) disposed for axial sliding movement in a hollow casing 45 mounted in dove-tail guideways on the side of the tool head 14 (Fig. 3). An axial spline connection between the feeler bar 44 and the casing 45 is formed by a pin 45ª (Fig. 2) coacting with a slot 45ᵇ in the periphery of the feeler bar. As best shown in Fig. 4, the outer end of the feeler is positioned a predetermined distance A behind the plane 15ª of the surfacing cutter 15 and consequently, when the feeler is in abutment with the face 10ᵇ of the slab 10, the active face of the cutter will be positioned for removing a thickness of metal corresponding to the dimension A. In order to adjust the operative position of the end of the feeler with respect to the plane 15ᵃ of the cutter face and thereby vary the distance A, a micrometer cap 46 is threaded on the end of the feeler bar 44 as indicated at 47 (Fig. 6). In the construction illustrated, the threads on the end of the feeler bar are so dimensioned that the end face 46ᵃ of the cap 46 will be moved axially of the feeler bar a distance of one-thirty-second of an inch for each quarter revolution of the micrometer cap. The micrometer head is held in its selected position of axial adjustment by ball 48 mounted in a bore 49 in the micrometer cap and pressed against the adjacent surface of the feeler bar by a small compression spring 50 so that it engages a selected one of the slots 51 (Fig. 7) disposed on the periphery of the feeler bar at intervals of ninety degrees. A scale 52 on the surface of the feeler bar 44 serves to indicate the adjusted position of the micrometer head.

As an incident to contact of the end face 46ᵃ of the feeler with an obstruction such as the surface of the work piece, a control mechanism associated with the power actuating devices of the machine is actuated as is hereinafter described in greater detail. The control mechanism has been illustrated in the form of a switch S₁ having an actuator pin 53 which is shifted by rearward movement of the feeler bar 44 through the medium of a motion amplifying link 54 (Fig. 4). The link 54 is pivoted on the casing 45 at 55 and is provided with a roller 56 arranged to be contacted and moved upwardly by a ledge or shoulder 57 on a wear plate 58 inserted in the upper side of the feeler bar 44. Thus, when the outer end of the feeler bar contacts the face of the stationary work piece, the feeler bar is shifted axially a slight amount relative to the tool head, thereby rotating the link 54 in a counterclockwise direction (as viewed in Fig. 4) which in turn moves the switch actuating pin 53 upwardly.

In order to advance the cutter 15 and feeler bar 44 simultaneously or synchronously toward the plane of the work piece, a common driving mechanism is utilized for these elements. As best shown in Figs. 2 and 3, this driving mechanism includes an electric motor 59 which rotates a worm 60 meshing with a worm wheel 61. A countershaft having two sections 62 and 63 coupled by an axial spline connection 64 is rotated by the worm wheel 61 while pinions 65 and 66 on the shaft sections 62 and 63 mesh respectively with racks 67 and 68 secured to the quill sleeve 33 and feeler bar casing 45. Since the quill sleeve 33 and casing 45 are thus mechanically connected and moved in unison, they, together with their connecting gearing, form in effect a single unit which may be conveniently termed a tool support and which, of course, carries both the scalping tool and feeler. It will thus be seen that upon energization of the electric motor 59, the quill sleeve 33 and feeler bar casing 45 are projected outwardly from the tool head 14 in timed relation, thereby carrying with them respectively the cutter 15 and feeler bar 44. As is hereinafter described in greater detail, the outward movement of the cutter and feeler bar is arrested through actuation of the control mechanism by switch S₁ upon contact of the feeler with the slab 10. It will be noted that the spline connection 64 permits axial removal of the shaft section 63 and its attached pinion 66 for purposes of inspection and repair. Furthermore, a rough adjustment of the relative positions of the feeler casing 45 and quill sleeve 33 may be had after first disconnecting the coupling 64.

In order to retract the feeler bar 44 after its contact with the work piece so as to leave the face of the slab unobstructed for the subsequent milling operation, a suitable separate actuating mechanism for the feeler has been provided. This actuating mechanism is shown in the form of a double acting hydraulic piston 69 (Fig. 2) secured to the inner end of the feeler bar 44 and slidable in a cylinder 70. Thus, when fluid pressure is applied to the inner face of the piston 69 through conduit 71, the feeler bar is retracted into the casing 45 and similarly, when fluid pressure is applied to the outer face of the piston through a conduit 72, the piston is again projected to its original position with respect to the milling cutter face. It will be seen that the feeler casing 45 and sleeve 33 have a synchronous axial movement with respect to the tool head but that the feeler bar itself may be moved relative to the casing 45 and cutter sleeve.

In some instances, it is desirable to effect the simultaneous movement of the cutter and feeler bar manually rather than by means of the power actuating mechanism. For this purpose, a clutch 73 is interposed between the motor 59 and worm 60. When it is desired to shift this clutch to disconnect the motor 59, a pinion 74 is rotated by a handwheel (not shown) on the end of a shaft 75. The pinion 74 engages a series of teeth formed on the upper side of a yoke 76 (Figs. 2 and 3) which is positioned in an annular groove 77 in the motor shaft. After having thus disconnected the electric motor 59, a manual operating shaft 78, having a squared end 79 adapted to receive a crank or the like, is operatively connected through a series of gears 80 to the worm 60 of the cutter and feeler shifting mechanism. These gears 80 are adapted to mesh with a gear 81 fast on a countershaft 82 (Fig. 3) having a bevel gear 84 at its inner end meshing with a second bevel gear 85 on the shaft of the worm 60. Axial shifting of the shaft 82 to move the gears 81 and 84 into and out of operative engagement with their complementary gears is had by means of a manually operable selector lever 86 which rotates a long pitch screw 87 on the outer end of the countershaft 82. This screw 87 is threaded in a boss 88 on the side of the tool head casing and in view of the long pitch of the thread, a partial revolution of the operating lever 86 serves to move gears 81 and 84 into or out of operative connection with their associated gears. When the gears 81 and 84 are meshed with their associated gears, the cutter 15 and feeler bar 44 may be moved manually to any exact position desired by rotation of the operating shaft 78.

After the cutter 15 has been located in a selected plane either by moving the same through the medium of a power actuating mechanism or manually, it is preferably locked against further axial movement. To this end, a semicircular casing member 89 is arranged to be clamped tightly against the quill sleeve 33 frictionally to prevent axial movement thereof. As best shown in Fig. 3, one lateral edge of the casing 89 is secured in position by cap screws 90 while cap screws 91 on the opposite side are sufficiently loose to permit of a small vertical movement of the casing. The clearance thus afforded is sufficient to permit free sliding movement of the quill sleeve 33 within the casing 89. In order to force the casing 89 downwardly against the quill sleeve and clamp the same against axial movement, a link 92 is fulcrumed on a bracket 93 and bears against an extension 94 on the side of the casing. Thus, when the link 92 is moved downwardly (as viewed in Fig. 3) pressure is applied to the extension 94 thereby clamping the casing 89 firmly against the quill sleeve. Movement is imparted to the actuating link 92 by a double acting hydraulic piston 95 mounted in a cylinder 96, pressure fluid being supplied selectively to one face or the other of the piston through conduits 97 and 98.

A control arrangement is preferably provided by means of which the machine tool described executes its entire cycle of operation automatically. The cycle includes the following steps: (1) rapid traversing of the carriage 11 from its initial position shown in Fig. 1 to a feeling position in which the work piece 10 is positioned opposite the feeler mechanism 16 but laterally offset from the cutter 15; (2) stoppage of the carriage in the feeling position; (3) approach movement of the feeler and cutter transversely with respect to the work piece; (4) stoppage of the feeler and cutter with the feeler in contact with a point on the surface of the work piece; (5) clamping of the cutter against further axial movement and retraction of the feeler; (6) feeding of the carriage 11 to move the work piece 10 past the rotating cutter 15 at a relatively slower feed rate; (7) stoppage of the carriage at the completion of the feed movement, unclamping of the cutter quill sleeve, and return of the cutter and feeler mechanism to their initial positions; (8) stoppage of the cutter quill and feeler casing in their initial retracted positions; (9) rapid return of the carriage to its initial position; and (10) stoppage of the carriage in its initial position.

Figure 8:
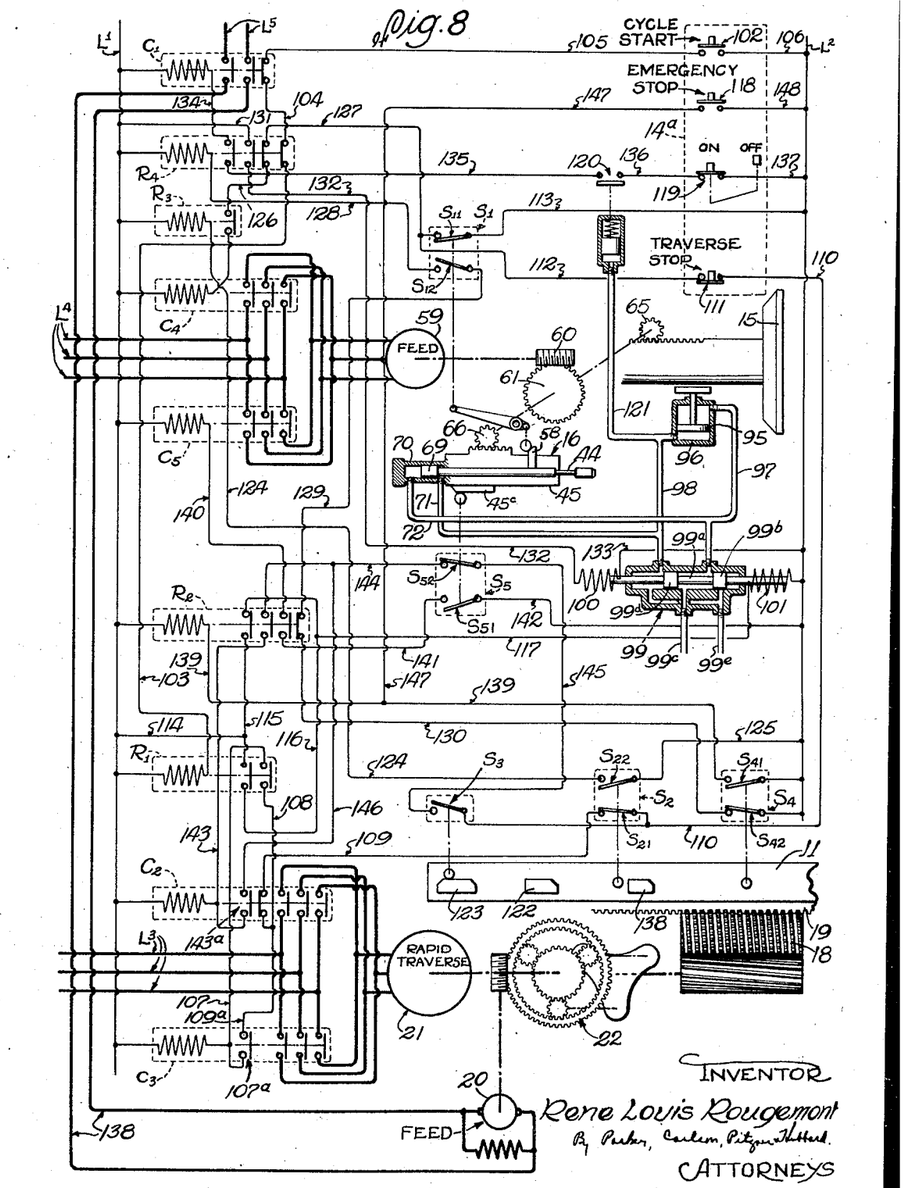
Fig. 8 is a wiring diagram of the control mechanism for the machine shown in Fig. 1, the associated parts being illustrated diagrammatically.

The electrical control circuits for effecting the foregoing cycle of operation are illustrated in Fig. 8. These may be controlled by an operator through the medium of a set of push button switches mounted on a panel 14$^a$ secured to the side of the tool head (Fig. 1) and including a cycle-start switch 102, a normally open emergency stop switch 118, a normally closed feed stop switch 119, and a normally closed traversing stop switch 111. In general, the complete cycle of operation may be initiated by a momentary closure of the cycle-start switch 102 while the operation of the feed motor may be stopped at any time and the cutter automatically retracted by a momentary actuation of the emergency stop switch 118. Also the cycle of operation may be interrupted just before the feeding of the work piece past the tool by maintaining the feed stop switch 119 open, and the rapid traverse motor 21 may be stopped at any time by opening the switch 111.

A plurality of switches $S_2$ to $S_5$, inclusive, as well as the switch $S_1$, heretofore noted, are actuated in response to movement of certain elements of the machine tool to condition the associated control circuits for the successive steps in the cycle of operation. Thus, the switch $S_1$ is actuated by contact between the feeler and work piece to effect clamping of the quill sleeve against further axial movement and to cause a retraction of the feeler; the switches $S_2$, $S_3$, and $S_4$ are actuated by dogs on the carriage 11 in response to the completion of various traversing and feeding movements of the table; and the switch $S_5$ is actuated by movement of a dog 45$^c$ (Fig. 2) on the feeler bar supporting casing 45. These switches $S_1$ to $S_5$, inclusive, effect their respective control operations by actuating a plurality of main switches and electrical devices through the medium of a series of interlock and circuit selection relays $R_1$ to $R_4$, inclusive, whose individual functions will be best understood by reference to the detailed description of circuit operation hereinafter set forth. These relays and associated control circuits are energized from supply lines $L_1$—$L_2$. In the arrangement shown, the main switches include a contactor or electromagnetic switch $C_1$ for connecting the feed motor 20 to its associated supply lines $L_5$, a pair of alternatively operable reversing contactors $C_2$ and $C_3$ for connecting the rapid traverse motor 21 to supply lines $L_3$ to effect rotation in a selected direction, and a similar pair of reversing contactors $C_4$ and $C_5$ for alternatively connecting the cutter feed motor 59 to supply lines $L_4$ for rotation in a selected direction. In addition, the main electrical control devices include electromagnetic actuators or solenoids 100 and 101 which operate a hydraulic valve mechanism 99 for the feeler bar and quill clamping pistons.

The solenoids 100 and 101 serve to move an axially slidable valve element 99$^a$ of a four-way valve 99. Thus, when the unclamping solenoid 101 is energized, the valve element 99$^a$ is shifted to the right (as viewed in Fig. 8) so that a land 99$^b$ thereon uncovers the valve port for conduits 72 and 97, permitting pressure fluid to flow therethrough from a suitable supply line 99$^c$. At the same time, a second land 99$^d$ uncovers the valve port for conduits 71 and 98, connecting them to an exhaust conduit 99$^e$. Pressure fluid is thus applied to project the feeler bar 44 outwardly and to unclamp the quill sleeve 33. Similarly, when the solenoid 100 is energized, the valve element 99$^a$ is shifted to the left so that the land 99$^b$ is moved beyond the port of conduits 72 and 97 thereby connecting them to the exhaust conduit 99$^e$ while the land 99$^d$ is moved beyond the port of conduits 71 and 98, thereby connecting them to the pressure supply line 99$^c$. In such case, the feeler bar 44 is retracted by the piston 69 and the piston 95 is moved downwardly causing the casing 89 to clamp the quill sleeve against axial movement.

The operation of the machine tool is initiated by momentary closure of the manually operable cycle-start push button switch 102 which serves in general to cause the traverse motor contactor $C_3$ to connect the rapid traverse motor 21 for rapid approach movement of the carriage 11, as well as to energize momentarily the unclamping solenoid 101, thereby insuring that the cutter quill sleeve 33 is unclamped and the feeler bar 44 fully projected by the piston 69. It is assumed that the cutter driving motor 42 is already in operation. Thus, upon closure of the cycle-start switch 102, the relay $R_1$ is energized (through a circuit $L_1$—$R_1$—103—$R_4$—104—$C_1$—105—102—106—$L_2$) thereby in turn energizing the rapid approach contactor $C_3$ (through a circuit $L_1$—$C_3$ — 107 — $R_1$—108—$C_2$—109—$S_{21}$—110—111—112—$S_{11}$—113—$L_2$). The inclusion in this circuit of the interlock contacts on the feed motor contactor $C_1$ provides an effective interlock for preventing initiation of the cycle except when the feed motor 20 is stopped. It will be seen that the relay $R_1$ remains closed only momentarily during the time that the cycle-start switch 102 is closed but the rapid approach contactor C₃ is maintained in closed position by its sealing contacts 107ᵃ (through a self-sealed circuit L₁—C₃—107ᵃ—109ᵃ—C₂—109—S₂₁—110—111—112—S₁₁—113—L₂). The momentary closure of the relay R₁ also completes an energizing circuit (L₁—114—115—R₁—116—117—101—L₂) for the hydraulic valve operator 101 so that unclamping of the cutter quill sleeve is insured. The closure of the contactor C₃ described connects the rapid traverse motor 21 to the supply lines L₃ for rotation in a direction to advance the carriage 11 at a rapid traverse rate for the first step in the cycle of operation.

The second step in the cycle of operation, namely, stoppage of the carriage 11 with the sleeve 10 disposed in alinement with the feeler mechanism 16 and laterally offset from the cutter 15 is effected by actuation of the switch S₂ through the medium of a dog 122 adjustably positioned on the carriage. It will also be noted that during the advancing movement of the carriage, a second dog 123 thereon releases the switch S₃, permitting the same to close and thereby conditioning the circuit of the rapid return-contactor C₃ for subsequent energization. Upon actuation of the switch S₂ at the completion of the advancing movement of the carriage, contacts S₂₁ thereof are opened and at the same time its contacts S₂₂ are closed. This opening of the contacts S₂₁ interrupts the sealing circuit of contactor C₃ previously described, thereby causing this contactor to be opened and stopping the rapid traverse motor. The dog 122 may be positioned at any point on the carriage with respect to the slab 10 in order to effect stoppage of the carriage at a selected point corresponding to the desired positioning of the work piece. It is particularly advantageous to perform the feeling operation in a period of dwell between the rapid traverse and feed movements since the positioning of the carriage at the end of its rapid traverse movement need be only approximate. In other words, the feeler is adapted to fix a reference point anywhere on the surface to be machined so that great nicety is not required in the control of the carriage in stoppage of its rapid traverse movement.

Closure of the switch contacts S₂₂ by the dog 122 noted above serves to initiate the fourth step in the cycle of operation, namely, the approach movement of the cutter and feeler with the work piece in the feeling position. Thus, closure of the switch contacts S₂₂ energizes the relay R₃ (through a circuit L₁—R₃—124—S₂₂—125—L₂) which in turn energizes the contactor C₄ (through a circuit L₁—C₄—R₃—126—R₄—127—S₁₁—113—L₂) thereby connecting the motor 59 to its supply lines L₄ for rotation to advance the cutter and feeler mechanism. It will also be noted that the initial movement of the feeler casing 45 actuates switch S₅ to close its contacts S₅₁ for subsequent completion of a circuit for return contactor C₅ of motor 59, and also to open contacts S₅₂ to prevent closing C₂ on subsequent closure of the relay R₂.

The advancing movement of the cutter and feeler mechanism continues in the fourth step of the cycle of operation until the outer end of the feeler contacts the surface of the work piece, thereby shifting the feeler bar slightly in an axial direction to actuate the switch S₁ as heretofore described. This actuation of the switch S₁ initiates the fifth step in the cycle of operation, namely, stoppage of the spindle feed motor 59, clamping of the cutter in its advanced position, and retraction of the feeler bar. Thus, upon actuation of the switch S₁ by displacement of the feeler bar 44, its contacts S₁₁ are opened and contacts S₁₂ closed. The opening of contacts S₁₁ breaks the energizing circuit of contactor C₄ described above, thereby stopping the motor 59. The simultaneous closure of contacts S₁₂ energizes the relay R₄ (through a circuit L₁—R₄—128—S₁₂—129—R₂—130—S₄₂—L₂) which in turn energizes the clamping solenoid 100 (through a circuit L₁—131—R₄—132—100—133—L₂) thereby admitting pressure fluid to the cylinders 70 and 96 respectively to retract the feeler bar 44 and clamp the quill sleeve 33 against axial movement. The plane of the active face of the cutter 15 is thus accurately positioned at the predetermined distance A beyond the face of the work piece, this predetermined distance being equal to the depth of the metal to be removed, and the feeler bar is retracted so that the subsequent machining operation may be performed without interference.

The sixth step in the cycle of operation, namely, the traversing of the carriage and work piece past the cutter at a relatively slower feed rate, is initiated in response to the pressure built up in the hydraulic actuating system upon completion of the clamping operation. Thus, when the clamping operation is completed, the fluid pressure in conduit 121 rises sufficiently to close a normally open pressure switch 120 to energize the feed motor contactor C₁ (through a circuit L₁—C₁—134—R₄—135—120—136—119—137—L₂) and this contactor in turn connects the feed motor 20 to its supply lines L₅ through conductors 138 to advance the carriage at the desired feed rate. It should be noted that the operation described presupposes that the push button switch 119 is in its closed position. In the event that the operator wishes to check the exact setting of the cutter 15 before the feeding operation is initiated, he opens the switch 119 before starting the cycle of operation in which case the machine will come to rest at the completion of the fifth step and before initiation of the sixth step. He can then start the machine in its sixth step or feeding movement by manual closure of the switch 119 after he has checked the setting of the cutter with respect to the work piece.

Stoppage of the carriage 11 at the completion of its feed movement for the seventh step in the cycle of operation is effected by actuation of the switch S₄ by a dog 138 adjustably positioned on the carriage. This actuation of the switch S₄ closes its contacts S₄₁ and opens its contacts S₄₂. The opening of switch contacts S₄₂ interrupts the energizing circuit for relay R₄, previously set forth, which in turn deenergizes the feed motor contactor C₁ to stop the feed motor. The simultaneous closing of switch contacts S₄₁ energizes the relay R₂ (through a circuit L₁—R₂—139—S₄₁—L₂) which serves to energize the unclamping solenoid 101 (through a circuit L₁—114—115—R₂—117—101—L₂) and to effect retraction of the cutter quill and feeler casing 45 by the motor 59, the latter being energized for reverse rotation upon closure of its reversing contactor C₅ (energized through a circuit L₁—C₅—140—R₂—141—S₅₁—142—L₂). Energization of the solenoid 101 causes the feeler bar 44 to be again projected from its casing 45 by the piston 69 so that at the end of the seventh step in the cycle of operation, the feeler and cutter mechanisms are in their initial positions. It will be noted that the previously described closure of switch contacts S₅₁ of the switch $S_5$ made possible the completion of the energizing circuit for the reversing contactor $C_5$ described upon the closure of relay $R_2$ during this seventh step in the cycle and also that the previous opening of the switch contacts $S_{52}$ prevented energization of the rapid traverse contactor $C_2$ by this momentary closure of the relay $R_2$.

The eighth step in the cycle of operation, namely, stoppage of the cutter quill sleeve and the feeler casing in their fully retracted or initial positions, is effected by actuation of the switch $S_5$ to its original position when the feeler casing 45 is fully retracted. This actuation of the switch $S_5$ opens the contacts $S_{51}$, thereby interrupting the previously described energizing circuit for the contactor $C_5$ to stop the motor 59. At the same time, contacts $S_{52}$ of the switch $S_5$ are closed to condition the control circuits for the next step in the cycle of operation.

The carriage 11 is then moved at a rapid return rate to its initial position in the ninth step in the cycle of operation by energization of the rapid traverse motor 21 upon closure of the rapid return contactor $C_2$, this contactor being energized by the previously described closure of switch contacts $S_{52}$ of switch $S_5$ (through a circuit $L_1$—$C_2$—143—$R_2$—144—$S_{52}$—145—$S_3$—110—111—112—$S_{11}$ 113—$L_2$). It will be noted that the contacts $S_{11}$ of the switch $S_1$, which are included in the circuit just set forth, were closed upon projection of the feeler bar 44 due to the energization of the solenoid 100. As soon as the carriage 11 starts its return movement, the dog 138 is disengaged from the switch $S_4$, thereby permitting contacts $S_{41}$ to open and deenergize the relay $R_2$. This opening of the relay $R_2$ does not, however, deenergize the rapid return contactor $C_2$ since the latter is maintained closed by its sealing contacts 143ª which complete a sealing circuit for the contactor $C_2$ in shunt with the relay $R_2$ and including the sealing contacts 143ª and a conductor 146.

The tenth step in the cycle of operation, namely, stoppage of the carriage 11 in its initial position, is effected by opening of the switch $S_3$ upon its being contacted by the dog 123 on the carriage. This opening of the switch $S_3$ interrupts the previously described circuit of the rapid return contactor $C_2$, thereby causing it to open and stop the rapid traverse motor 21.

The feed movement of the carriage 11 and retraction of the feeler and cutter may be effected at any time by closure of the emergency stop switch 118. Upon reference to the wiring diagram in Fig. 8, it will be seen that this stop switch 118 completes an energizing circuit for the relay $R_2$ ($L_1$—$R_2$—139—147—118—148—$L_2$) so that the resultant operations are substantially those had upon closure of contacts $S_{41}$ of the switch $S_4$ previously described in the seventh step of the cycle of operation. Thus, energization of the relay $R_2$ in turn causes the clamping solenoid 100 to be deenergized and the unclamping solenoid 101 to be energized, as well as closure of the contactor $C_5$ to effect reverse rotation of the motor 59, thereby retracting the cutter and feeler. This retractive movement of the cutter and feeler is stopped by actuation of the switch $S_5$ as previously described in the eighth step in the cycle of operation. Moreover, the actuation of the unclamping solenoid 101 releases the pressure in the fluid system so that the pressure operated switch 120 opens, thereby deenergizing the feed motor contactor $C_1$ to stop the feed motor.

In the event that the operator wishes to stop the rapid traverse motor 21 at any time, this operation may be effected by opening the normally closed traverse-stop switch 111. This switch is arranged to interrupt the sealed circuits of either of the reversing contactors $C_2$ (having an energizing circuit $L_1$—$C_2$—143ª—146—144—$S_{52}$—145— $S_3$—110—111—112—$S_{11}$—113—$L_2$) or $C_3$ (having an energizing circuit $L_1$—$C_3$—107ª—109ª—$C_2$— 109—$S_{21}$—110—111—112—$S_{11}$—113—$L_2$) previously described. It will thus be seen that full and effective control of the machine is had throughout all steps of its operation and that it may be safely controlled despite any emergencies which may arise.

I claim as my invention:

1. A machine tool comprising, in combination, a work support, a tool support, a cutting tool positioned on said tool support, a feeler carried by said tool support and having its active portion disposed in a plane located a predetermined distance behind the active cutting edge of said tool, means for effecting relative movement between said work support and tool support transversely of a work piece carried by said work support to bring said feeler into contact with a point on the surface of the work piece to be machined, means actuated as an incident to contact between said feeler and the work piece for preventing further relative transverse movement between said cutting tool and the work piece, and power actuating means for effecting relative movement between said tool and work supports longitudinally of the surface of the work piece to be machined.

2. A machine tool comprising, in combination, a work support, a tool support, a cutting tool positioned on said tool support, a feeler carried by said tool support and having its work engaging portion disposed in a plane located a predetermined distance behind the active cutting edge of said tool, means for effecting relative movement between said work support and tool support transversely of a work piece carried by said work support to bring said feeler into contact with a point on the surface of the work piece to be machined, means actuated as an incident to the contact between said feeler and the work piece for stopping further relative transverse movement and for retracting said feeler out of contact with the work piece, and power actuating means for effecting relative movement between said tool and work supports longitudinally of the surface of the work piece to be machined.

3. A machine tool comprising, in combination, a work support, a tool support, a cutting tool positioned on said tool support, a feeler carried by said tool support and disposed in a plane located a predetermined distance behind the active cutting edge of said tool, means for effecting relative movement between said work support and feeler to bring said feeler into contact with a point on the surface of a work piece to be machined and for bringing said cutting tool into laterally offset relation with respect to an end of the work piece and with the active cutting edge thereof positioned said predetermined distance beyond said feeler, and power actuating means for effecting relative movement between said tool and work supports longitudinally of the surface of the work piece to be machined.

4. A machine tool for scalping a face of a metal slab or the like comprising, in combination, a reciprocable work supporting carriage, a tool support, a surfacing cutter carried by a rotatable shaft on said tool support, driving means for said cutter, a longitudinally slidable spline connection between said shaft and driving means whereby said cutter may be moved transversely with respect to said carriage, a feeler carried by said tool support and having a micrometer head adjustable to a selected position behind the active face of said cutter, means for moving said tool support toward said carriage to bring said feeler into contact with a point on the surface of a work piece to be machined and for moving said cutter into laterally offset relation with respect to the work piece and with the active face thereof positioned said predetermined distance beyond said feeler, means actuated by contact between said feeler and the work piece for interrupting the advancing movement of said tool support and for retracting said feeler, and power actuating means for reciprocating said carriage to move the work piece carried thereby progressively past said cutter.

5. A machine tool comprising, in combination, a reciprocable work support carriage, power actuating means for moving said carriage selectively at a rapid traverse rate and at a relatively slower feed rate, a rotatable surfacing cutter carried on an axially movable shaft disposed transversely with respect to the line of reciprocation of said carriage, a feeler laterally offset with respect to said cutter and shiftable toward and away from said carriage, a second power actuating means for shifting said cutter and feeler toward said carriage in timed relation and with the active face of said cutter displaced a predetermined distance forwardly of the feeler, said predetermined distance being equal to the thickness of the layer of metal to be removed from a work piece on said carriage, means including a control member for initiating operation of said first-named power means to effect a rapid approach movement of said carriage toward said cutter and feeler, means to stop said rapid approach movement with said feeler and work piece in alinement and to initiate an approach movement of said cutter and feeler transversely of the work piece by said second power actuating means, means actuated in response to contact between said feeler and work piece for locking said cutter against further axial movement transversely with respect to the work piece, and for retracting said feeler out of contact with the work piece, means rendered operable by retraction of said feeler for instituting a feed movement of said carriage by said first-named power actuating means, and means responsive to a completion of the feed movement of the work piece across the face of said cutter for rendering said first-named power actuating means operative to return said carriage to its initial position at a rapid traverse rate.

6. A machine tool comprising, in combination, relatively movable work and tool supports, a feeler arranged to contact the surface of a work piece carried by said work support, a surface cutter on said tool support adapted to scalp a surface of the work piece and having the active face thereof axially displaced a predetermined distance from said feeler equal to the thickness of the layer of metal to be removed, means responsive to the actuation of a control member for effecting a rapid approach movement between said supports longitudinally of the work piece, means to stop said longitudinal rapid approach movement with said feeler and work piece alined in feeling position and to initiate an approach movement of said supports and feeler transversely of the work piece, means actuated in response to contact between said feeler and work piece for locking said supports against further transverse movement and for retracting said feeler out of contact with the work piece, means rendered operable by retraction of said feeler for effecting relative traversing movement between said supports longitudinally of the work piece at a slow feed rate, and means responsive to completion of the feed movement of said cutter across the face of the work piece for initiating a rapid return movement of said supports to their initial position.

7. A machine tool comprising, in combination, relatively movable work and tool supports, a feeler arranged to contact the surface of a work piece carried by said work support, a surfacing cutter on said tool support adapted to scalp a surface of the work piece and having the active face thereof axially displaced a predetermined distance from said feeler equal to the thickness of the layer of metal to be removed, means responsive to the actuation of a control member for effecting an approach movement between said supports and feeler transversely of the work piece to bring said feeler into contact with the work piece and with said cutter laterally offset therefrom, means responsive to contact between said feeler and work piece for locking said supports against further movement transversely of the work piece and for retracting said feeler out of contact with the work piece, means rendered operable by retraction of said feeler for effecting relative traversing movement between said supports longitudinally of the work piece at a slow feed rate, and means responsive to completion of the feed movement of said cutter across the face of the work piece for initiating a rapid return movement of said supports to their initial position.

8. A machine tool comprising, in combination, relatively movable work and tool supports, a scalping tool carried by said tool support adapted to remove a surface layer of metal from a work piece carried by said work support, means for effecting an approach movement between said supports at a rapid traverse rate and a subsequent relatively slower feed movement, and means including a feeler adapted to contact the work piece at the completion of the rapid traverse movement for accurately positioning the work and tool supports prior to initiation of the feed movement, said feeler being operative upon engagement with any portion of the work piece surface to be machined to control the positioning of said supports whereby great nicety of control need not be exercised in determining the point of stoppage of said rapid traverse movement.

9. A machine tool comprising, in combination, relatively movable work and tool supports, power actuating means for effecting relative movement between said supports at a rapid traverse rate or at a slower feed rate; automatic control means governing said power actuating means to effect a selected cycle of relative movement between said supports including an approach movement at a rapid traverse rate, a feed movement, and subsequent rapid return movement to initial position; and means rendered operable at will at any point in the cycle for automatically interrupting said cycle of movement just prior to the institution of said feed movement, whereby the operator may check the accuracy of the positioning of said supports at the completion of the approach movement.

10. A machine tool comprising, in combination, relatively movable work and tool support elements, a feeler element arranged to contact the surface of a work piece carried by said work support element, a surfacing cutter on said tool support element adapted to scalp a surface of the work piece and having the active face thereof axially displaced a predetermined distance from said feeler equal to the thickness of the layer of metal to be removed; power actuating means for moving said elements automatically through a cycle of movement including, an approach movement of said elements transversely with respect to the work piece to bring them into feeling position with said feeler element in contact with the work piece surface and with said cutter laterally offset therefrom, a retractive movement of said feeler out of contact with the work piece, and a slow feed movement of said support elements longitudinally of the work piece; and control means operable at will at any point in the cycle to interrupt said cycle of operation automatically just prior to the initiation of said slow feed movement.

11. A machine tool comprising, in combination, relatively movable work and tool support elements, a feeler element arranged to contact the surface of a work piece carried by said work support element, a surfacing cutter on said tool support element adapted to scalp a surface of the work piece and having the active face thereof axially displaced a predetermined distance from said feeler equal to the thickness of the layer of metal to be removed; and power actuating means for moving said elements automatically through a cycle of movement including, an approach movement of said elements transversely with respect to the work piece to bring them into feeling position with said feeler element in contact with the work piece surface and with said cutter laterally offset therefrom, a retractive movement of said feeler out of contact with the work piece, and a slow feed movement of said support elements longitudinally of the work piece.

12. A machine tool comprising, in combination, relatively movable work and tool supports, a scalping tool carried by said tool support, a feeler carried by said tool support and arranged to contact the surface of a work piece carried by said work support, means for moving said feeler on said tool support into and out of a predetermined position with respect to the plane of the active edge of said scalping tool, power actuating means for effecting an approach movement between said supports, and interlock means for preventing initiation of the operation of said power actuating means except when said feeler is in said predetermined position.

13. A machine tool comprising, in combination, relatively movable work and tool supports, a scalping tool carried by said tool support, a feeler carried by said tool support and arranged to contact the surface of a work piece carried by said work support, means for moving said feeler on said tool support into and out of a predetermined position with respect to the plane of the active edge of said scalping tool, power actuating means including an electrical control circuit for effecting an approach movement between said supports, a starting switch in said control circuit for initiating operation of said power actuating means, and interlock means between said switch and feeler for preventing initiation of the operation of said power actuating means except when said feeler is in said predetermined position with respect to said scalping tool.

14. A machine tool comprising, in combination, relatively movable work and tool supports, power actuating means for effecting an advancing movement between said supports to bring a tool carried by said tool support into operative relation with a work piece on said work support, a second power actuating means for effecting a feeding movement between said supports when advanced into operative relation, and emergency control means operable at will to stop said second power actuating means and to cause said first-named power actuating means to move said supports out of operative relation.

15. A machine tool comprising, in combination, a work support, a tool support, a cutting tool positioned on said tool support, a feeler adapted to contact the work piece surface to be machined including an elongated member extending toward said work support and having the outer end thereof located a predetermined distance behind the active edge of said cutting tool, means supporting said feeler member for endwise movement on said tool support, and means for simultaneously projecting said feeler and cutting tool toward said work support to thereby locate the active edge of the cutting tool in a position to subsequently machine the work surface to be machined to a depth equal to said predetermined distance upon contact between said feeler and surface.

16. In a machine tool the combination of a tool head, a cutter carried by a rotatable shaft, power actuating means operatively connected to said cutter, means supporting said shaft for axial and rotational movement on said tool head, a feeler member mounted for movement on said tool head longitudinally of said shaft for contacting the work piece surface to be machined, means for adjusting the position of the outer end of said feeler with respect to the active face of said cutter, and means for simultaneously projecting said feeler and cutter shaft outwardly from said tool head.

17. In a machine tool the combination of a tool head, a cutter carried by a rotatable shaft, power actuating means operatively connected to said cutter, means supporting said shaft for axial and rotational movement on said tool head, an elongated feeler bar mounted for endwise movement on said tool head in parallelism with said shaft to contact the work piece surface to be machined, an axially adjustable contacting cap threaded on the outer end of said feeler bar adjacent the plane of the active face of said cutter, and means for simultaneously projecting said feeler and cutter shaft outwardly from said tool head.

18. In a machine tool the combination of a tool head, a cutter mounted for bodily translatory movement on said tool head, a feeler mounted for movement on said tool head in a path paralleling that of said cutter, alternatively available power and manual actuating mechanisms for effecting simultaneous synchronous movement of said feeler and cutter, and selector means for selectively rendering one or the other of said mechanisms operative.

19. In a machine tool the combination of a tool head, a rotatable cutter mounted for axial movement thereon, a feeler mounted on said tool head for movement in a path paralleling the axis of said cutter, means for projecting said cutter and feeler in unison outwardly from said tool head, and means for retracting said feeler independently of said cutter.

20. In a machine tool the combination of a tool head, a cutter carried by a rotatable shaft, power actuating means operatively connected to said cutter, means including a sleeve surrounding said shaft and having a rotary spline connection therewith for supporting said shaft on said tool head for axial and rotational movement with respect thereto, an elongated feeler bar disposed in parallel relation with the axis of said shaft, means including a casing surrounding said feeler bar and having a longitudinal spline connection therewith for supporting the same on said tool head, and means including a pair of interconnected pinions meshing with racks on said sleeve and casing for simultaneously projecting said feeler bar and cutter outwardly from said tool head.

21. In a machine tool the combination of a tool head, a cutter carried by a rotatable shaft, power actuating means operatively connected to said cutter, means including a sleeve surrounding said shaft and having a rotary spline connection therewith for supporting said shaft on said tool head for axial and rotational movement with respect thereto, an elongated feeler bar disposed in parallel relation with the axis of said shaft, means including a casing surrounding said feeler bar and having a longitudinal spline connection therewith for supporting the same on said tool head, means including a pair of interconnected pinions meshing with racks on said sleeve and casing for simultaneously projecting said feeler bar and cutter outwardly from said tool head, and means including a fluid actuated piston operatively connected to said feeler bar for shifting the same axially in said casing.

22. In a machine tool the combination of a tool head, a cutter carried by a rotatable shaft, power actuating means operatively connected to said cutter, means including a sleeve surrounding said shaft and having a rotary spline connection therewith for supporting said shaft on said tool head for axial and rotational movement with respect thereto, an elongated feeler bar disposed in parallel relation with the axis of said shaft, means including a casing surrounding said feeler bar and having a longitudinal spline connection therewith for supporting the same on said tool head, means including a pair of interconnected pinions meshing with racks on said sleeve and casing for simultaneously projecting said feeler bar and cutter outwardly from said tool head, and fluid pressure operated means for retracting said feeler bar in said casing and locking said sleeve against axial movement in said tool head.

23. In a machine tool the combination of a tool head, a cutter carried by a rotatable shaft, power actuating means operatively connected to said cutter, means supporting said shaft for axial and rotational movement on said tool head, a feeler member mounted for movement on said tool head longitudinally of said shaft, means for adjusting the position of the outer end of said feeler with respect to the active face of said cutter, means for simultaneously projecting said feeler and cutter shaft outwardly from said tool head, and means for clamping said shaft against further axial movement when in its projected position.

24. In a machine tool relatively movable work and tool supports, a feeler arranged to contact a work piece on said work support during relative movement between said supports in a selected direction, control means governed by an electrical control circuit for preventing further movement between said supports in said direction upon actuation thereof, and means including a switch interposed in said circuit and disposed for actuation by said feeler upon contact thereof with the work piece to render said control means operative to prevent further movement between said supports in said direction.

25. A machine tool having, in combination, a scalping cutter, a support therefor, a work support, said supports being mounted for relative movement parallel to and also transversely of the face of said cutter, a feeler mounted on said cutter support for movement relative to the cutter transversely of said cutter face, means responsive to actuation of said feeler during transverse movement of said supports toward each other to position said cutter for removal of a predetermined layer of material from the work piece, means responsive to such positioning to cause retraction of said feeler out of engagement with the work piece, and means controlled by such retraction to initiate relative movement of said supports to present the work piece to said cutter.

26. A machine tool having, in combination, a scalping cutter, a support therefor, a work support, said supports being mounted for relative movement parallel to and also transversely of the face of said cutter, a feeler on said cutter support adapted, during transverse movement of said supports toward each other, to engage a work piece on said work support and control the relative positioning of said cutter for effecting removal of a predetermined layer of material from the work piece, and means operating as an incident to such positioning to initiate relative movement of said supports to present the work piece to said cutter.

27. A machine tool having, in combination, a work support, a tool support, a power rotated surfacing cutter on said tool support, a power actuator for feeding said supports relative to each other to relatively move a work piece on the work support across the face of said cutter, a second power actuator for effecting relative transverse feeding movement between said supports toward each other to bring the face of said cutter into the path of said work piece, a feeler engageable with the work piece during said transverse feeding movement, means responsive to movement of said feeler upon engagement of the work to interrupt said transverse feeding movement, and mechanism controlling said actuators after surfacing of the work piece to retract the cutter and then return said supports to carry a work piece on the work support back past the cutter.

28. A machine tool having, in combination, a scalping cutter, a support therefor, a work support, said supports being mounted for relative movement longitudinally and also transversely of the face of said cutter, a feeler mounted on said cutter support for movement relative thereto and engageable with a work piece on said work support, means responsive to movement of said feeler by the work piece during transverse movement of said supports toward each other, to interrupt such movement with the cutter positioned to effect removal of a predetermined layer of material from the work piece.

29. A machine tool having, in combination, work and cutter supports, a scalping cutter on the cutter support, means for effecting relative movement of said supports to carry a work piece past said cutter, means for temporarily interrupting such relative movement before engagement of the work piece and cutter, a feeler engageable with the work piece during such interruption, and means controlled by said feeler to effect relative lateral positioning of said supports and thereby locate said cutter for removal of a predetermined depth of material from said work piece in the continued relative movement between said supports.

30. A machine tool having, in combination, a work support, a tool support, a power rotated surfacing cutter on said tool support, power actuated means for feeding said supports relative to each other to relatively move a work piece on the work support across the face of said cutter, a power actuator for effecting relative transverse feeding movement between said supports, a feeler moved by said actuator toward a work piece on said work support during said transverse feeding movement, and means controlled in response to the movement of said feeler upon engagement of the work piece to interrupt said transverse feeding movement with said cutter positioned to remove a predetermined layer of material from the work piece.

31. A machine tool having, in combination, a work support, a tool support, a surfacing cutter on said tool support, power actuated means for feeding said supports relative to each other to relatively move a work piece on the work support across the face of said cutter, a power actuator for effecting relative transverse feeding movement between said supports, a feeler engageable with the work piece during said transverse feeding movement and operating to cause interruption of the latter with said cutter positioned for removal of a predetermined layer of metal from the work piece.

RENÉ LOUIS ROUGEMONT.